United States Patent
Lokesh

(10) Patent No.: US 11,216,857 B2
(45) Date of Patent: Jan. 4, 2022

(54) WEATHER ENHANCED GRAPHICAL PREVIEW FOR AN ONLINE TICKET MARKETPLACE

(71) Applicant: StubHub, Inc., San Francisco, CA (US)

(72) Inventor: Gaurav Lokesh, Dublin, CA (US)

(73) Assignee: StubHub, Inc., San Francisco, CA (US)

( * ) Notice: Subject to any disclaimer, the term of this patent is extended or adjusted under 35 U.S.C. 154(b) by 733 days.

(21) Appl. No.: 15/190,999

(22) Filed: Jun. 23, 2016

(65) Prior Publication Data

US 2017/0372390 A1 Dec. 28, 2017

(51) Int. Cl.
| | |
|---|---|
| G06Q 10/02 | (2012.01) |
| G06Q 30/06 | (2012.01) |
| G06F 16/29 | (2019.01) |
| G06F 16/951 | (2019.01) |

(52) U.S. Cl.
CPC ......... *G06Q 30/0613* (2013.01); *G06F 16/29* (2019.01); *G06F 16/951* (2019.01); *G06Q 10/02* (2013.01)

(58) Field of Classification Search
CPC ..................................... G06Q 10/02
See application file for complete search history.

(56) References Cited

U.S. PATENT DOCUMENTS

| | | | |
|---|---|---|---|
| 5,333,257 A | 7/1994 | Merrill et al. | |
| 7,250,945 B1 | 7/2007 | Scaman et al. | |
| 7,412,442 B1 | 8/2008 | Vadon et al. | |
| 7,562,051 B1 | 7/2009 | Donner | |
| 7,584,123 B1 | 9/2009 | Karonis et al. | |
| 7,778,853 B2 | 8/2010 | Sussman et al. | |
| 8,024,234 B1 | 9/2011 | Thomas et al. | |
| 8,090,603 B2 | 1/2012 | Payne et al. | |
| 8,126,748 B2 | 2/2012 | Sunshine et al. | |

(Continued)

FOREIGN PATENT DOCUMENTS

| | | |
|---|---|---|
| WO | 00/65506 A2 | 11/2000 |
| WO | 2002069078 A2 | 9/2002 |

(Continued)

OTHER PUBLICATIONS

RateYourSeats.com, Shaded and Covered Seating at Dodger Stadium, WebArchive copy dated Jul. 20, 2015, https://www.rateyourseats.com/showratings/dodger-stadium-mlb/best-seats/shade-and-cover (Year: 2015).*

(Continued)

*Primary Examiner* — Daniel Vetter
(74) *Attorney, Agent, or Firm* — McDermott Will & Emery LLP

(57) ABSTRACT

A method to present a personalized list of items is disclosed. The method may include presenting information pertaining to an event via a display device. The information pertaining to the event may include a time element. The method may further include receiving a selection of a location associated with the event. The method may also include sending a request for the digital image to preview the event from the location and for weather data in view of the time element. The method may include receiving the digital image and the weather data. The method may further include presenting the digital image and the weather data via the display device.

20 Claims, 9 Drawing Sheets

(56) References Cited

U.S. PATENT DOCUMENTS

| | | |
|---|---|---|
| 9,600,781 B2 | 3/2017 | Zamer |
| 10,332,040 B2 | 6/2019 | Zamer |
| 10,614,384 B2 | 4/2020 | Ngo et al. |
| 2002/0077931 A1 | 6/2002 | Henrion et al. |
| 2002/0082879 A1 | 6/2002 | Miller et al. |
| 2002/0082969 A1 | 6/2002 | O'Keefe et al. |
| 2003/0061147 A1 | 3/2003 | Fluhr et al. |
| 2003/0066883 A1 | 4/2003 | Yuan |
| 2003/0069827 A1 | 4/2003 | Gathman et al. |
| 2003/0164925 A1 | 9/2003 | Kutner |
| 2003/0202017 A1 | 10/2003 | Fukuoka et al. |
| 2004/0006497 A1 | 1/2004 | Nestor et al. |
| 2004/0230440 A1 | 11/2004 | Malhotra |
| 2005/0004820 A1 | 1/2005 | LeMieux |
| 2005/0015303 A1 | 1/2005 | Dubin et al. |
| 2005/0128304 A1 | 6/2005 | Manasseh et al. |
| 2005/0131658 A1 | 6/2005 | Mei et al. |
| 2006/0116916 A1 | 6/2006 | Bowman et al. |
| 2006/0116930 A1 | 6/2006 | Goldstein |
| 2007/0033110 A1 | 2/2007 | Philipp et al. |
| 2007/0064208 A1 | 3/2007 | Giegerich |
| 2007/0276595 A1 | 11/2007 | Lewinson et al. |
| 2008/0004917 A1 | 1/2008 | Mortimore |
| 2008/0082355 A1 | 4/2008 | Leach et al. |
| 2008/0103934 A1 | 5/2008 | Gibson et al. |
| 2008/0162211 A1 | 7/2008 | Addington |
| 2008/0188308 A1 | 8/2008 | Shepherd |
| 2008/0189147 A1 | 8/2008 | Bartlett |
| 2008/0189747 A1 | 8/2008 | DiFonzo et al. |
| 2008/0255889 A1 | 10/2008 | Geisler et al. |
| 2008/0281644 A1 | 11/2008 | Payne |
| 2009/0006143 A1 | 1/2009 | Orttung et al. |
| 2009/0006373 A1 | 1/2009 | Chakrabarti et al. |
| 2009/0063204 A1 | 3/2009 | Stirlen et al. |
| 2009/0063206 A1 | 3/2009 | Payne et al. |
| 2009/0063207 A1 | 3/2009 | Brodzeller |
| 2009/0204600 A1 | 8/2009 | Kalik et al. |
| 2009/0256839 A1 | 10/2009 | Bastian |
| 2009/0273213 A1 | 11/2009 | Mukherjee |
| 2009/0287687 A1 | 11/2009 | Martire et al. |
| 2010/0057743 A1 | 3/2010 | Pierce |
| 2010/0070888 A1 | 3/2010 | Watabe et al. |
| 2010/0082374 A1 | 4/2010 | Charania et al. |
| 2010/0113072 A1 | 5/2010 | Gibson et al. |
| 2010/0174510 A1 | 7/2010 | Greco |
| 2010/0217679 A1 | 8/2010 | Eckstein |
| 2010/0257002 A1 | 10/2010 | Brett |
| 2010/0287033 A1 | 11/2010 | Mathur |
| 2010/0312587 A1 | 12/2010 | Benson et al. |
| 2011/0093340 A1 | 4/2011 | Kramer et al. |
| 2011/0178827 A1 | 7/2011 | Orenstein |
| 2011/0178891 A1 | 7/2011 | Charriere |
| 2011/0208418 A1 | 8/2011 | Looney et al. |
| 2011/0238454 A1 | 9/2011 | Nestor et al. |
| 2011/0238497 A1 | 9/2011 | Milne |
| 2012/0010911 A1 | 1/2012 | Lele et al. |
| 2012/0010912 A1 | 1/2012 | Lele et al. |
| 2012/0078667 A1 | 3/2012 | Denker et al. |
| 2012/0095862 A1 | 4/2012 | Schiff et al. |
| 2012/0191551 A1 | 7/2012 | Lutnick et al. |
| 2012/0226575 A1 | 9/2012 | Goldberg et al. |
| 2012/0253983 A1 | 10/2012 | Lewin |
| 2012/0323488 A1 | 12/2012 | Callaghan |
| 2012/0323612 A1 | 12/2012 | Callaghan |
| 2013/0054278 A1 | 2/2013 | Sharp |
| 2013/0085790 A1 | 4/2013 | Palmer et al. |
| 2013/0096961 A1 | 4/2013 | Owens et al. |
| 2013/0124234 A1 | 5/2013 | Nilsson et al. |
| 2013/0159026 A1 | 6/2013 | Rogel et al. |
| 2013/0268899 A1 | 10/2013 | Valentino |
| 2013/0304521 A1 | 11/2013 | Aird |
| 2013/0317868 A1 | 11/2013 | Diamond et al. |
| 2013/0332525 A1 | 12/2013 | Liu et al. |
| 2014/0019172 A1 | 1/2014 | Oxenham et al. |
| 2014/0025688 A1 | 1/2014 | Andler et al. |
| 2014/0058766 A1 | 2/2014 | Yu et al. |
| 2014/0121967 A1 | 5/2014 | Anbalagan et al. |
| 2014/0129629 A1 | 5/2014 | Savir |
| 2014/0142994 A1 | 5/2014 | Matarazzi et al. |
| 2014/0180734 A1 | 6/2014 | Gibson et al. |
| 2014/0195277 A1† | 7/2014 | Kim |
| 2014/0257879 A1 | 9/2014 | Sink et al. |
| 2014/0278591 A1 | 9/2014 | Blecharczyki et al. |
| 2015/0052001 A1 | 2/2015 | Yuan |
| 2015/0061993 A1 | 3/2015 | Itoh |
| 2015/0066546 A1 | 3/2015 | Scarborough et al. |
| 2015/0100354 A1* | 4/2015 | Horowitz ............... G06Q 10/02 705/5 |
| 2015/0106134 A1 | 4/2015 | Gandham et al. |
| 2015/0120341 A1 | 4/2015 | Scarborough |
| 2015/0134371 A1 | 5/2015 | Shivakumar et al. |
| 2015/0161525 A1 | 6/2015 | Hirose et al. |
| 2015/0161528 A1 | 6/2015 | Yalcin et al. |
| 2015/0186973 A1 | 7/2015 | Athimoolam |
| 2015/0242763 A1 | 8/2015 | Zamer |
| 2015/0242889 A1 | 8/2015 | Zamer et al. |
| 2015/0242916 A1 | 8/2015 | Godsey |
| 2015/0287119 A1† | 10/2015 | Bhan |
| 2015/0379479 A1 | 12/2015 | Nagaraj |
| 2016/0189060 A1 | 6/2016 | Ngo |
| 2016/0232468 A1 | 8/2016 | Meiri et al. |
| 2016/0267404 A1 | 9/2016 | Shicoff et al. |
| 2017/0161784 A1 | 6/2017 | Malik |
| 2017/0193407 A1 | 7/2017 | Zamer |
| 2017/0262918 A1* | 9/2017 | Sweeney ................. G06Q 10/02 |
| 2017/0270587 A1* | 9/2017 | Wolfson ............. G06Q 30/0629 |
| 2017/0308903 A1 | 10/2017 | Agranonik et al. |
| 2017/0364835 A1† | 12/2017 | Baker |
| 2017/0364990 A1 | 12/2017 | Vasvani |
| 2018/0018595 A1 | 1/2018 | Scott et al. |
| 2018/0025402 A1 | 1/2018 | Morris |
| 2018/0047085 A1 | 2/2018 | Lokesh et al. |
| 2019/0266521 A1 | 8/2019 | Zamer |
| 2020/0184556 A1 | 6/2020 | Cella |

FOREIGN PATENT DOCUMENTS

| | | |
|---|---|---|
| WO | 2015126510 A1 | 8/2015 |
| WO | 2015126512 A1 | 8/2015 |
| WO | 2017218625 A1 | 12/2017 |
| WO | 2017223002 A1 | 12/2017 |

OTHER PUBLICATIONS

Wolfson, U.S. Appl. No. 62/295,648, filed Feb. 16, 2016.*

Gündüz, et al., On the Key Factors of Usability in Small-sized Mobile Touch-Screen Application, International Journal of Multimedia and Ubiquitous Engineering, vol. 8, No. 3, May 2013, pp. 115-138 (Year: 2013).*

Xie, et al., Interface Design for a Modern Software Ticketing System, ACMSE '04, Apr. 3-4, 2004, Huntsville, AL, USA, pp. 122-127 (Year: 2004).*

International Search Report and Written Opinion received for PCT Application No. PCT/US2017/038193, dated Sep. 6, 2017, 8 pgs.

Extended European Search Report dated Dec. 9, 2019 as received in Application No. 17816012.3.

International Preliminary Report, as issued in connection with International Patent Application No. Application No. PCT/US2017/038193, dated Dec. 25, 2018, 7 pgs.

U.S. Office Action in U.S. Appl. No. 13/966,649, dated Dec. 24, 2014, 19 pgs.

U.S. Office Action in U.S. Appl. No. 13/966,649, dated Apr. 28, 2015, 25 pgs.

U.S. Office Action in U.S. Appl. No. 13/966,649, dated Nov. 24, 2015, 25 pgs.

U.S. Office Action in U.S. Appl. No. 13/966,649, dated Apr. 13, 2016, 24 pgs.

U.S. Office Action in U.S. Appl. No. 13/966,649, dated Sep. 15, 2016, 23 pgs.

U.S. Office Action in U.S. Appl. No. 13/966,649, dated Apr. 12, 2017, 29 pgs.

(56) References Cited

OTHER PUBLICATIONS

U.S. Office Action in U.S. Appl. No. 13/966,649, dated Sep. 21, 2017, 26 pgs.
U.S. Office Action in U.S. Appl. No. 13/966,649, dated Apr. 24, 2018, 22 pgs.
U.S. Office Action in U.S. Appl. No. 13/966,649, dated Sep. 25, 2018, 11 pgs.
U.S. Office Action in U.S. Appl. No. 13/966,649, dated Jan. 29, 2019, 12 pgs.
U.S. Office Action in U.S. Appl. No. 13/966,649, dated Nov. 10, 2020, 10 pgs.
U.S. Office Action in U.S. Appl. No. 14/055,750, dated Dec. 1, 2016, 13 pgs.
U.S. Office Action in U.S. Appl. No. 14/055,750, dated Jun. 16, 2017, 14 pgs.
U.S. Office Action in U.S. Appl. No. 14/055,750, dated Nov. 30, 2017, 16 pgs.
U.S. Office Action in U.S. Appl. No. 14/055,750, dated Sep. 7, 2018, 8 pgs.
U.S. Office Action in U.S. Appl. No. 14/055,750, dated Jan. 2, 2019, 8 pgs.
U.S. Office Action in U.S. Appl. No. 14/055,750, dated Jul. 25, 2019, 8 pgs.
U.S. Office Action in U.S. Appl. No. 14/055,750, dated Aug. 1, 2019, 8 pgs.
U.S. Office Action in U.S. Appl. No. 14/055,750, dated Dec. 20, 2019, 8 pgs.
U.S. Office Action in U.S. Appl. No. 14/055,750, dated Jun. 11, 2020, 8 pgs.
U.S. Office Action in U.S. Appl. No. 14/055,750, dated Dec. 14, 2020, 6 pgs.
U.S. Office Action in U.S. Appl. No. 15/237,601, dated Aug. 2, 2019, 19 pgs.
U.S. Office Action in U.S. Appl. No. 15/237,601, dated Jan. 9, 2020, 22 pgs.
U.S. Office Action in U.S. Appl. No. 15/237,601, dated Jul. 16, 2020, 19 pgs.
U.S. Office Action in U.S. Appl. No. 15/237,601, dated Nov. 4, 2020, 13 pgs.
U.S. Office Action in U.S. Appl. No. 16/411,530, dated Sep. 6, 2019, 11 pgs.
U.S. Office Action in U.S. Appl. No. 16/411,530, dated Mar. 18, 2020, 14 pgs.
U.S. Office Action in U.S. Appl. No. 16/411,530, dated Sep. 23, 2020, 10 pgs.
International Search Report and Written Opinion, as issued in connection with International Patent Application No. PCT/US2014/069850, dated Mar. 18, 2015, 6 pgs.
International Search Report and Written Opinion, as issued in connection with International Patent Application No. PCT/US2014/070136, dated Mar. 17, 2015, 8 pgs.
International Search Report and Written Opinion, as issued in connection with International Patent Application No. PCT/US2017/037385, dated Aug. 31, 2017, 8 pgs.

\* cited by examiner
† cited by third party

WEATHER ENHANCED GRAPHICAL PREVIEW FOR AN ONLINE TICKET MARKETPLACE

FIELD

The embodiments discussed in the present disclosure are related to weather enhanced graphical preview for an online ticket marketplace.

BACKGROUND

Ticket marketplace websites provide users the ability to purchase tickets for events. The tickets are used to reserve seats and/or admission for events, such as sporting events, concerts, theater events, and other entertainment events. On some of the websites, a user searches for available tickets and decides which, if any, of the available tickets are of interest to the user and have the best value. To allow a user to make an informed decision on which tickets to obtain, the ticket marketplace website may provide information about venues in which the events are taking place.

The subject matter claimed in the present disclosure is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
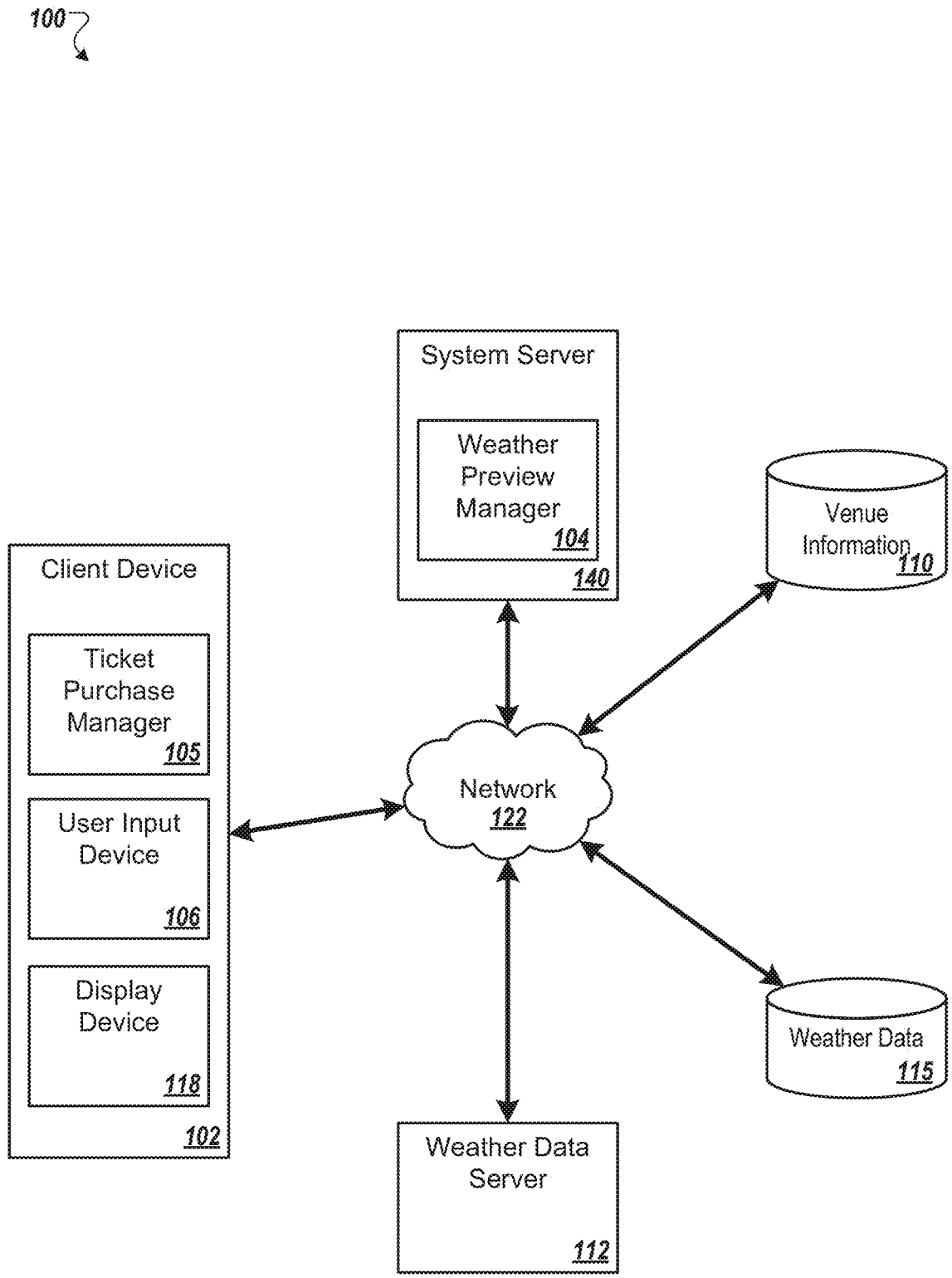
FIG. 1 illustrates an example operating environment in which an online ticket marketplace may be implemented.

Some embodiments of the present disclosure may relate to generating a weather enhanced graphical preview for an online ticket marketplace. Under conventional systems, when a user visits an online ticket marketplace to purchase a ticket to an event, the user may be provided with little information about the ticket or about a seat (or section) that corresponds to the ticket. Although users may be able to purchase tickets to an event using modern technology, conventional systems may not provide weather information for a seating section or a particular seat. Without the ability to preview weather information, the user may select and/or purchase a ticket for a seat that is in direct sunlight for a sustained period of time during the event.

Aspects of the present disclosure address these and other deficiencies of conventional systems by generating a weather enhanced graphical preview for an online ticket marketplace. The weather enhanced graphical preview may include a digital image of a view from a seating section or from a particular seat that includes weather information. For example, a server may provide a full 360 degree view from a particular seat to a buyer. Various weather conditions may also supplement the view from the seat. The weather conditions may include a position of the sun as seen from a seating section or a seat and a typical direction and/or speed of the wind as experienced at the seat, etc. The weather conditions may also be presented based on a time component, such that the buyer may view predicted weather conditions at or near the actual time of the event. In addition, the buyer may view changes in weather conditions (e.g., changes in the position of the sun in the sky) from the seat and at different times as the event progresses. The wind direction may be illustrated as one or more arrows, text, icons, etc. For example, a flag may be positioned in a direction of the wind. The flag may also be labeled with a wind direction and/or a wind speed, etc.

In some embodiments of the present disclosure, the weather enhanced graphical preview may be presented at a client device. For example, a method may include presenting information pertaining to an event via a display device. The information pertaining to the event may include a time element. The method may further include receiving a selection of a location associated with the event. The method may also include sending a request for the digital image to preview the event from the location and for weather data in view of the time element. The method may include receiving the digital image and the weather data. The method may further include presenting the digital image and the weather data as the weather enhanced graphical preview via the display device.

The disclosed weather enhanced graphical preview may be used in any application and in different scenarios where being able to preview predicted weather data would be beneficial. For example, such scenarios may include attending a sports event in an arena, booking a room in a resort/hotel with the view that captures positioning of the sun at different times of a particular day, or home rental/purchases without physically visiting the property, among others.

In at least one embodiment, a server-based method may include receiving, from a client device, location data pertaining to a physical location in a venue. The venue may include an item of interest. The method may further include determining a direction toward the item of interest based on the location data. The method may also include identifying weather data associated with the location data and the direction. The method may include sending the weather data to the user device. The weather data may be presented together with a digital image on an electronic display of the client device. In at least one embodiment, the weather data may be presented together with a digital image on a virtual reality device or an augmented reality device.

FIG. 1 illustrates an example operating environment 100 in which an online ticket marketplace (hereinafter, "marketplace") may be implemented. In the operating environment 100, a user may interact with their client device 102 to search for and/or obtain tickets, which may be listed on a site that is hosted or controlled by a system server 140. The tickets may be for an event that occurs at a venue. As a user interacts with the client device 102, an enhanced seat (or section) view may be provided to a client device 102 from a system server 140 via a network 122. The weather enhanced graphical preview may depict a seat view from a particular location (e.g., a seating section, a particular seat) in the venue. The enhanced seat view may include a digital image that includes weather data as may be viewed while sitting in the seating section or seat. The image may include a 360-degree image. As used in this disclosure, the term "360-degree image" includes image data from vertical viewing angles and horizontal viewing angles greater than about 300 degrees for a particular point.

The operating environment 100 of FIG. 1 may include a system server 140, a client device 102, the network 122, and a weather data server 112. The system server 140, the client device 102, and the weather data server 112 (collectively, environment components) may communicate information and data via the network 122. For example, one or more of the environment components may communicate information and data related to ticket transactions such as the weather enhanced graphical previews, user input, and event information. Each of the environment components is briefly described in the following paragraphs.

The network 122 may include a wired network, a wireless network, or any combination thereof. The network 122 may include any suitable configuration or configurations including a star configuration, token ring configuration, or other configurations. The network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols. In some embodiments, the network 122 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and the like.

The user may include an individual or an entity that may interface with the client device 102 to participate in a ticketing search or a ticketing transaction. For example, the user may include a person who wants to purchase a ticket for a particular event that is going to take place in the venue. The user may be associated with the client device 102.

The client device 102 may include a computing device that may include a processor, memory, and network communication capabilities. The client device 102 may be configured for communication with one or more other environment components via the network 122. Some examples of the client device 102 include a laptop computer, a desktop computer, a tablet computer, a mobile telephone, a smartphone, a personal digital assistant ("PDA"), a mobile e-mail device, a portable game player, a portable music player, smart wearable technology, a reality device, an augmented reality device, or any other applicable electronic device capable of directly or indirectly accessing the network 122.

The client device 102 may include a user input device 106, a display device 118, and a ticket purchase manager 105. The user input device 106 may include one or more pieces of hardware configured to notify the user of the client device 102 of a communication, and/or present a communication to the user. In these and other embodiments, the user input device 106 may also be configured to receive input from the user of the client device 102. In some embodiments, the user input device 106 may include one or more of: a speaker, a microphone, a display device (e.g., the display device 118), a joystick, a direction pad (D-pad), a trigger input, a motion sensor, eye tracker, a trackpad, a thermal input capturing device, a keyboard, and a touch screen, among other hardware devices.

The display device 118 may include a substantially planar surface on which information and data are displayed to the user. In addition, in some embodiments, at least a portion of the user input may be received by the display device 118. Some examples of the display device 118 may include a light emitting diode (LED) display, liquid crystal displays (LCD) thin film transistor (TFT) LCD, in-place switching (IPS) LCD, resistive touchscreen LCD, capacitive touchscreen LCD, organic LED (OLED), active-matrix OLED, etc. In at least one embodiment, the display device 118 includes a curve. In at least one embodiment, the display device 118 is configured to present virtual reality or augmented reality data including the weather enhanced graphical preview.

The ticket purchase manager 105 may be configured to implement a marketplace interaction with the system server 140 that involves one or more of the weather enhanced graphical previews. In some embodiments, the ticket purchase manager 105 may display on the display device 118 of the client device 102, a digital map. The digital map (as described below) is a representation of a venue. The digital map may depict seating sections and/or seats of the venue as arranged for a particular event.

The ticket purchase manager 105 may receive user input via the user input device 106 used to select one seating section or one seat of the venue. The ticket purchase manager 105 may receive or access from the system server 140 a digital image of a view from the selected seating section or the selected seat. The digital image may be a weather enhanced graphical preview that includes weather data. In at least one embodiment, the ticket purchase manager 105 may receive the weather data from the system server 140. The weather data may be included with the digital image. In at least one embodiment, the ticket purchase manager 105 may receive the weather data from a weather data server 112 and the ticket purchase manager 105 may combine the weather data with the digital image. In at least one embodiment, the ticket purchase manager 105 may receive instructions from the system server 140 pertaining to how to combine the weather data with the digital image to create the weather enhanced graphical preview. In at least one embodiment, the ticket purchase manager 105 may send a request for the instructions to the system server 140. The weather enhanced graphical previews may include different views from a seat or seating section at different times. For example, the weather enhanced graphical previews may depict the sun in a different position in each view.

In at least one embodiment, the client device may include a view control (e.g., a slider bar) to toggle between weather enhanced graphical previews. In at least one embodiment, thumbnails of different selectable weather enhanced graphical previews may be presented via the client device. The user may select a thumbnail to cause the underlying weather enhanced graphical previews to become presented in the display device 118. The ticket purchase manager 105 may display an informational overlay of at least a portion of event information, or information pertaining to the particular view (e.g., time information), or some combination thereof on the display device 118.

The ticket purchase manager 105 may be implemented using hardware including a processor, a microprocessor (e.g., to perform or control performance of one or more operations), a field-programmable gate array (FPGA), or an application-specific integrated circuit (ASIC). In some other instances, the ticket purchase manager 105 may be implemented using a combination of hardware and software. Implementation in software may include rapid activation and deactivation of one or more transistors or transistor elements such as may be included in hardware of a computing system (e.g., the client device 102). Additionally, software defined instructions may operate on information within transistor elements. Implementation of software instructions may at least temporarily reconfigure electronic pathways and transform computing hardware.

The venue may include any forum in which events may take place or are performed. From at least one of the seats in the venue, a user may view the sun during daytime hours. Some examples of the venue may include a stadium, an arena, a theatre, a parking lot, a fairground, and the like. The event may include any type of happening in which tickets are used for entry. Some examples of the event are sporting events, concerts, plays, movies, festivals, and the like.

The weather data server 112 may include a hardware server that includes a processor, memory, and network communication capabilities. In the illustrated implementation, the weather data server 112 is configured to communicate via the network 122 with the other environment components. The weather data server 112 may track and provide information that pertains to potential weather at a particular event at any given time that is to occur or is occurring at the venue. For example, the event information may include positional information of the sun as it appears in the sky. In at least one embodiment, the weather data server 112 may receive, from one or more sources, digital images that depict the venue and weather data. For example, a user may capture a digital image from a location in the venue and may upload to the weather data server 112. The digital image may include metadata indicating the location and time. The weather data server 112 may index the digital image according to the location and time. In at least one embodiment, the weather data server 112 may identify digital images from one or more social networks, identify location and time metadata corresponding to those digital images, and index those digital images. In at least one embodiment, the weather data server 112 may use two or more images from the same location and at different times to reconstruct a path of the sun based on different times. A representation of the sun may be interpolated and depicted along that path at any time depending on a user request to preview sun data from the location and at a given time.

The system server 140 may include a hardware server that includes a processor, memory, and network communication capabilities. In the illustrated implementation, the system server 140 is configured to communicate via the network 122 with the other environment components. The system server 140 may include a weather preview manager 104. The weather preview manager 104 may generate weather enhanced graphical previews based on user requests, as further described in conjunction with FIG. 6.

The operating environment 100 may also include a venue information database 110 and a weather data database 115. The venue information database 110 may store venue information pertaining to one or more particular event occurring at the venue. For example, the event information includes one or more ticket prices for one or more seating sections or from one or more seats of the venue, ticket availability for one or more seating sections or for one or more of the seats of the venue, weather data for one or more seats or seating sections of the venue at any given time, and the like.

The venue information may originate at the system server 140. For instance, the venue information may be generated through sales of tickets to users. Some of the venue information may also originate at the weather data server 112. For example, the weather data server 112 may track weather data at one or more venues and may provide the weather data to weather data database 115, to the system server 140 and/or to the client device 102. The weather data server 112 may communicate the weather data to the system server 140 or the system server 140 may retrieve the weather data from the weather data database 115. Accordingly, the venue information database 110 may include updated weather data or weather data as it applies to a particular venue or event. Although not explicitly shown in FIG. 1, the weather data in the venue information database 110 may also originate at other sources. For example, the system server 140 may call another server, such as via an Application Programming Interface (API) to retrieve the weather data. While the venue information database 110 is depicted in the system server 140, in other embodiments, the venue information database 110 may be located remotely and accessed by the system server 140.

The venue information 110 may also include two-dimensional or three-dimensional digital images, the weather enhanced graphical previews, and digital maps of the venue. The digital images may be non-interactive or fixed views from one or more of the seats and/or views from one or more of the seating sections of the venue. The digital images may include portions of a computer-aided design (CAD) model of the venue and/or actual photographic images of the venue.

The weather enhanced graphical previews may include portions of the CAD model and/or actual photographic images of the venue. In embodiments in which the weather enhanced graphical previews includes photographic images of the venue, the client device 102 may be used as a view finder through which the venue is viewed. Photographic images displayed on the client device 102 may be enhanced by overlaying information over the photographic images. The information overlaid on the photographic image may include informational overlays (e.g., seat prices, weather data, and/or seat availability).

The weather preview manager 104 may be configured to implement a marketplace interaction with the client device 102 that involves one or more of the weather enhanced graphical previews. In some embodiments, the weather preview manager 104 may communicate to the client device 102, the digital map. The weather preview manager 104 may communicate the digital map to the client device 102 or may enable access to the digital map by the client device 102. Additionally or alternatively, the weather preview manager 104 may provide or communicate instructions to the client device 102 that result in the digital map being presented on the display device 118.

The weather preview manager 104 may receive, from the client device 102, user input. The user input may be used to select one seating section or one seat of the venue 114. In response to the user input that selects the seating section or the seat, the weather preview manager 104 may communicate to the client device 102 a two-dimensional digital image (without weather data) of a view from the selected section or from the seat.

The weather preview manager 104 may receive, from the client device 102, additional user input. The additional user input may be used to select an option to view weather data in conjunction with the digital image. In response to the additional user input that selects the option to view weather data, the weather preview manager 104 may communicate to the client device 102 to the weather enhanced graphical preview that is consistent with the selected weather data. The option may include, for example, an option to view a position of the sun at a particular time, or range of time, wind data, etc.

As mentioned above, the weather enhanced graphical preview may depict a seat view from a particular location (e.g., a seat or a seating section) in the venue that includes weather data.

The weather preview manager 104 may display on the display device 118 a purchase icon. The weather preview manager 104 may receive, from the client device 102, user input used to select the purchase icon. In response to the user input that selects the purchase icon, the weather preview manager 104 may execute a transaction for a ticket for the particular event in the selected seating section or for the selected seat.

The weather preview manager 104 may be implemented using hardware including a processor, a microprocessor (e.g., to perform or control performance of one or more operations), an FPGA, or an ASIC. In some other instances, the weather preview manager 104 may be implemented using a combination of hardware and software. Implementation in software may include rapid activation and deactivation of one or more transistors or transistor elements such as may be included in hardware of a computing system (e.g., the system server 140). Additionally, software defined instructions may operate on information within transistor elements. Implementation of software instructions may at least temporarily reconfigure electronic pathways and transform computing hardware.

Modifications, additions, or omissions may be made to FIG. 1 without departing from the scope of the present disclosure. For example, the operating environment 100 may include more or fewer elements than those illustrated and described in the present disclosure. For example, the operating environment 100 may include any number of devices or servers.

Moreover, the separation of various components in the embodiments described herein is not meant to indicate that the separation occurs in all embodiments. It may be understood with the benefit of this disclosure that the described components may be integrated together in a single component or separated into multiple components. For example, in some embodiments the user input device 106 and the display device 118 may be a single device. In another example, one or more of the venue information database 110 or the weather data database may be included with the system server 140.

Figure 2:
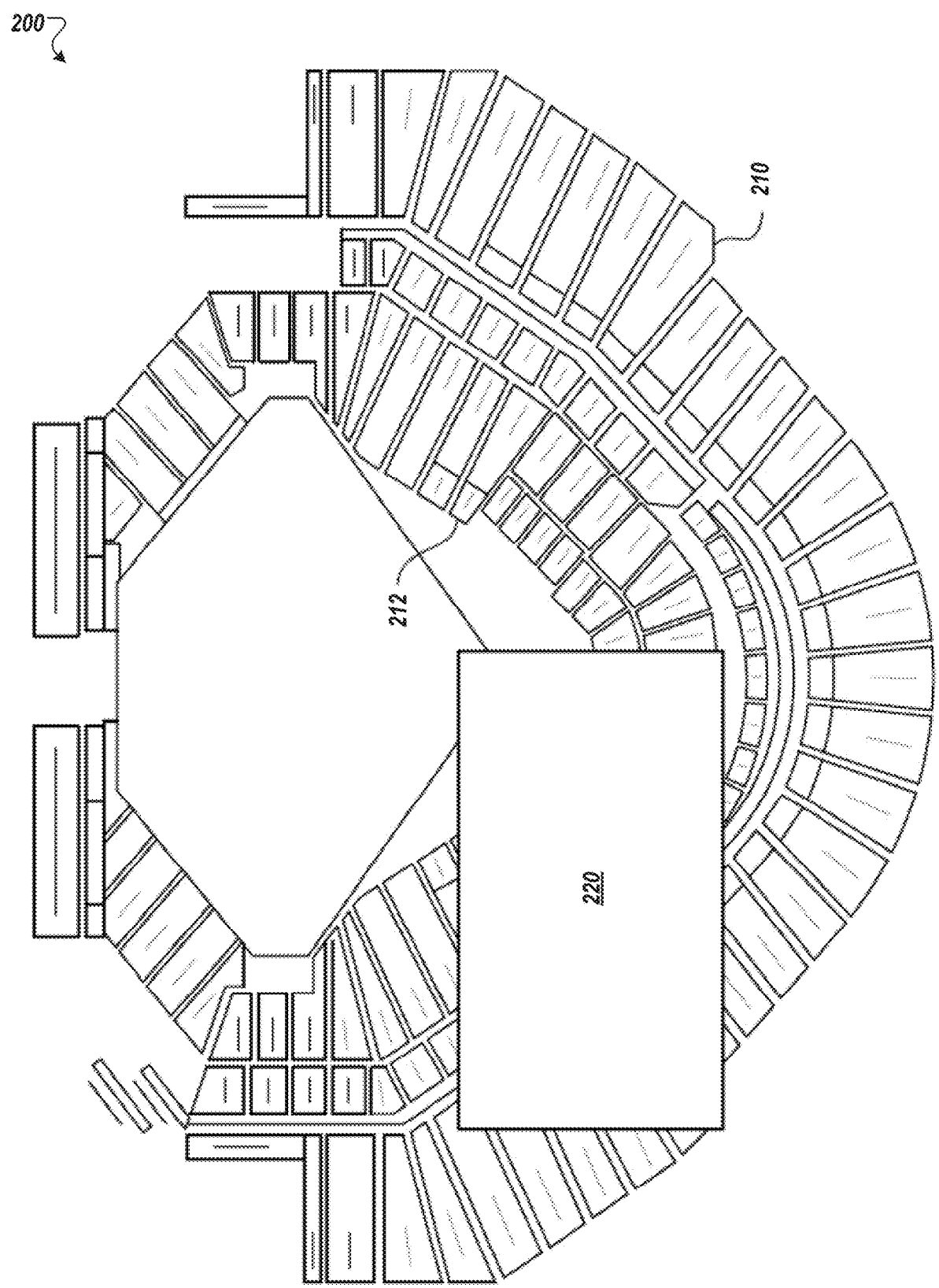
FIG. 2 illustrates an example of an interactive visual element.

FIG. 2 illustrates an example of an interactive visual element 200, in accordance with one or more embodiments of the present disclosure. The interactive visual element 200 may include a venue map 210 with one more sections (e.g., section 212) depicting a venue with listings of seats for purchase. The interactive visual element 200 may additionally include a window 220 for displaying listings.

The interactive visual element 200 may be configured such that a user viewing the interactive visual element 200 may interact with a user interface to select one or more features of the interactive visual element 200. Interacting with the user interface may allow the user to perform a query, refine a query, examine a listing, etc. For example, if a user were to click on the section 212 of the venue map 210, the window 220 may display a textual description of listings in that section. Window 220 may also display an image, such as a digital image depicting a view from the section or from a particular seat. The window 220 may also display a weather enhanced graphical preview that includes weather data and the digital image.

Figure 4A:
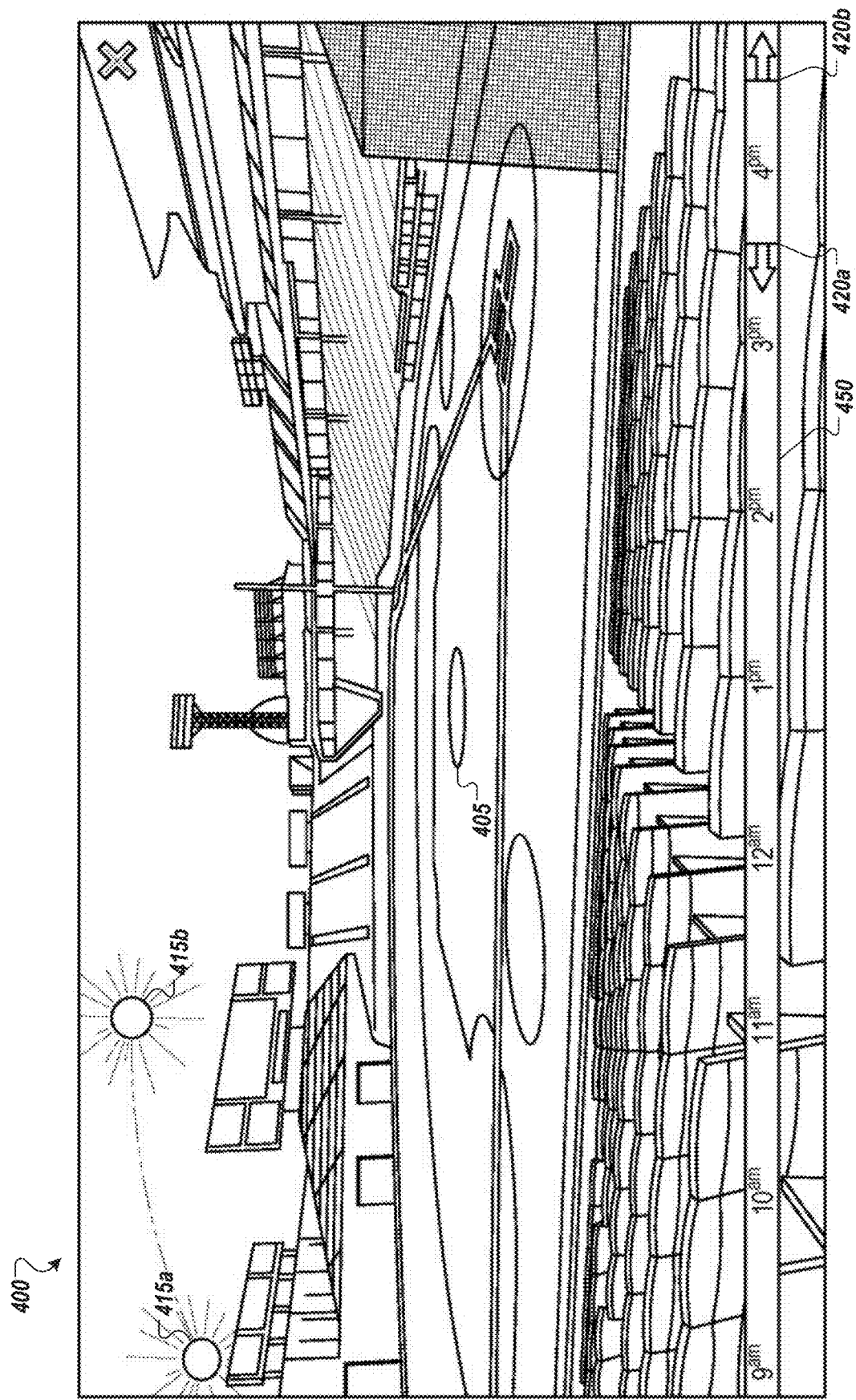
FIG. 4A illustrates an example weather enhanced graphical preview from a particular location in a venue.
Figure 4B:
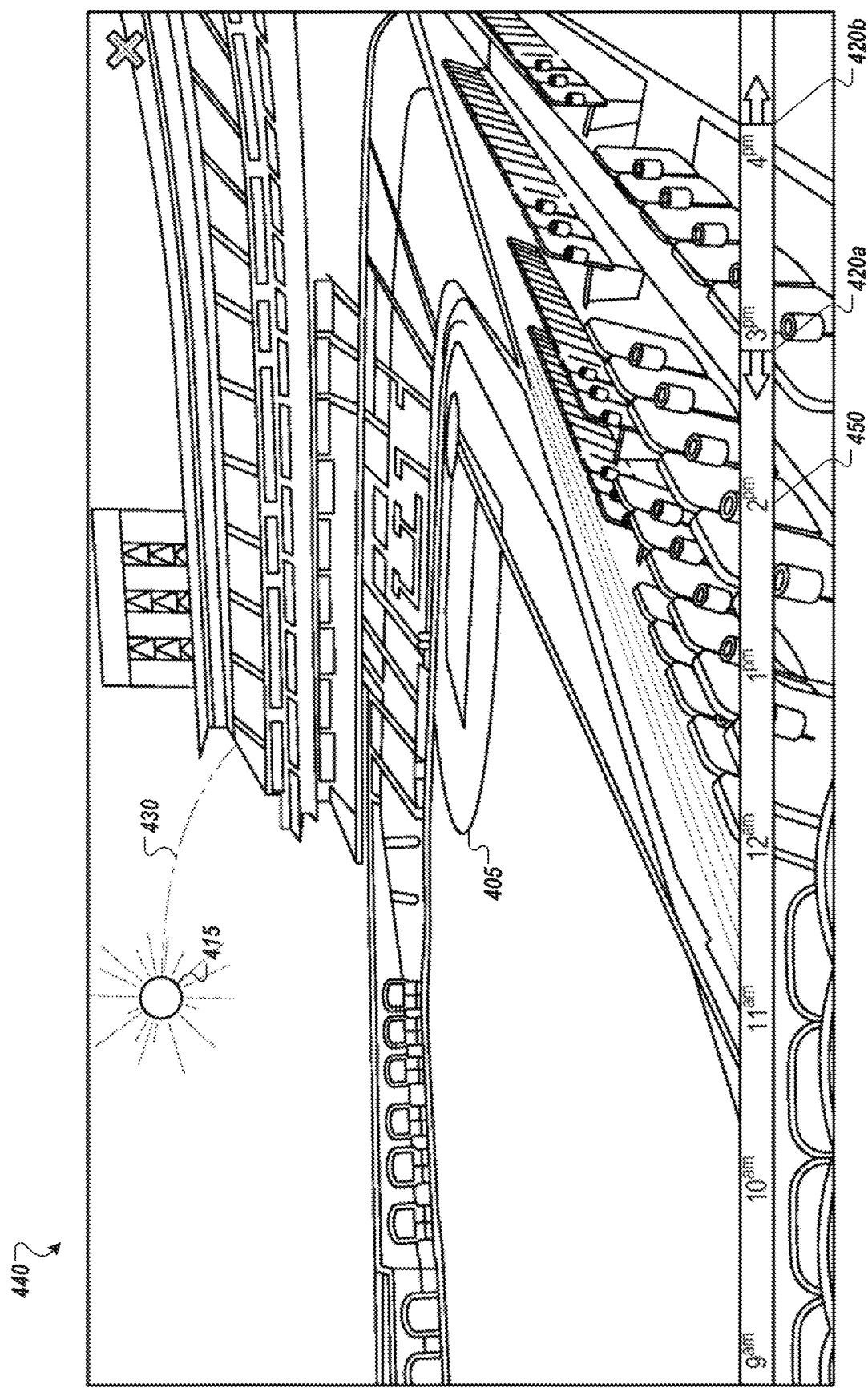
FIG. 4B illustrates another example weather enhanced graphical preview that may include a sun in the context of a particular sports stadium.
Figure 4C:
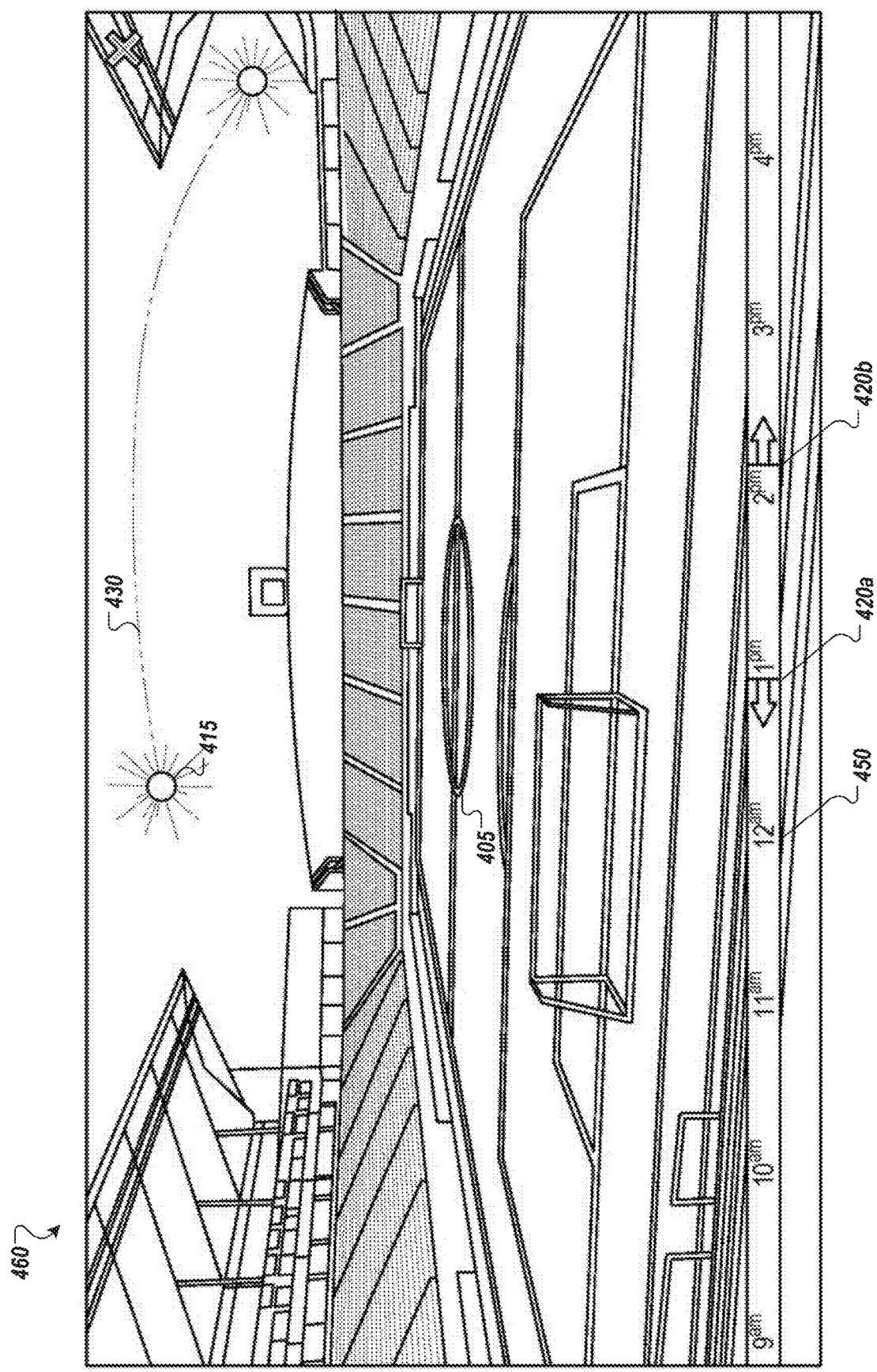
FIG. 4C illustrates yet another example weather enhanced graphical preview that may include a sun in the context of a particular sports stadium.

In some embodiments, the window 220 may be sized and/or positioned to overlay portions of the venue map 210, for example, as illustrated in FIGS. 4A, 4B and 4C. In these and other embodiments, the window 220 may be sized and/or positioned based on the display properties of the display of the device used by the user. For displays with lower resolution and/or smaller display areas, the window 220 may overlay a larger portion of the venue map 210. For displays with high resolution and/or larger display areas, the window 220 may overlay a smaller portion of the venue map 210. In at least one embodiment, a full screen mode may be entered and the window 220 may be displayed in substantially all of the display area.

Figure 3:
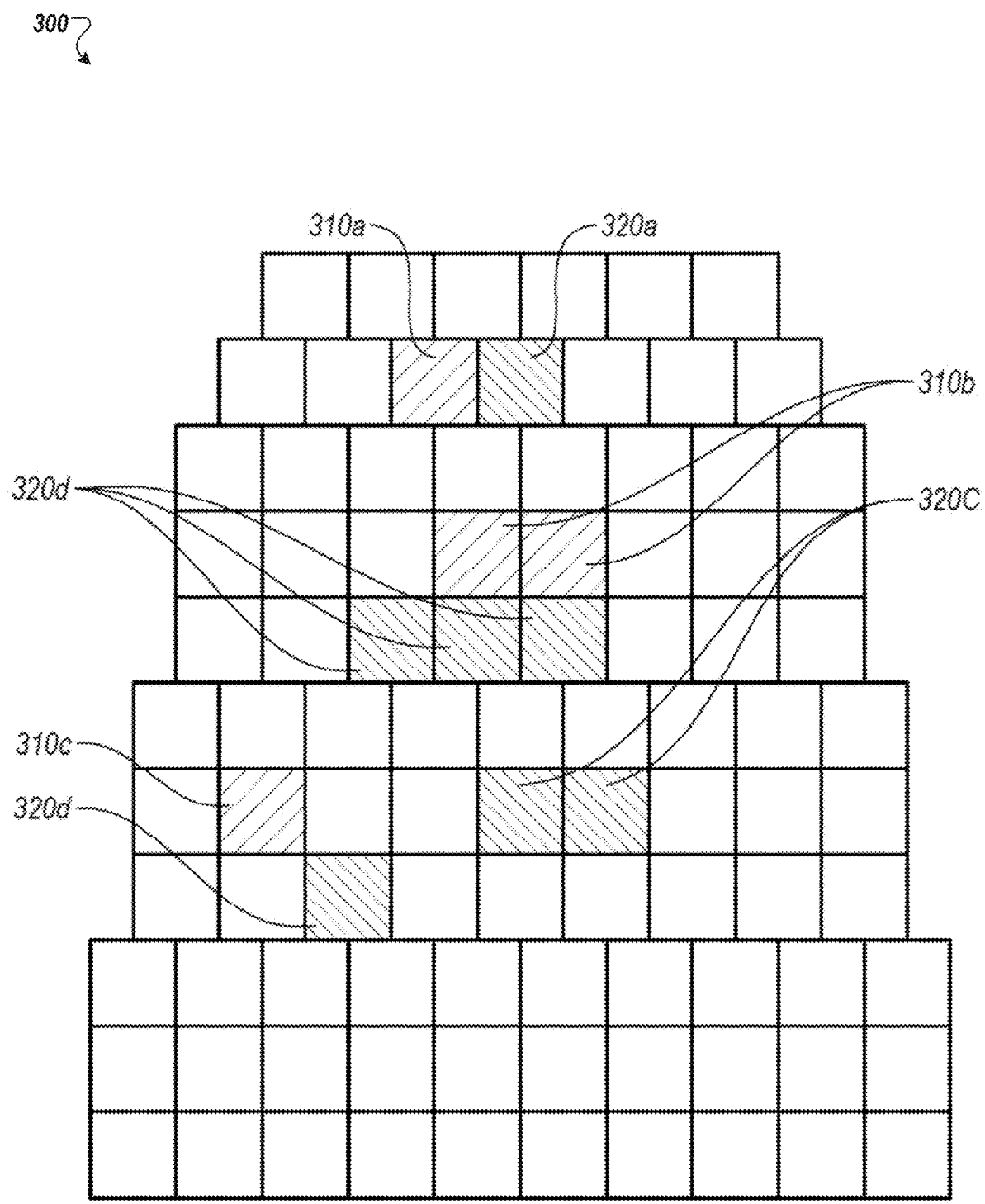
FIG. 3 illustrates another example interactive visual element.

By selecting a section of the venue map 210, in some embodiments the interactive visual element 200 may display the venue map 210 replaced with a map of the selected section. For example, the interactive visual element 200 may include a map of a section as illustrated in FIG. 3 rather than the entire venue map 210 as illustrated in FIG. 2. In these and other embodiments, the window 220 may overlay a portion of the map of the section.

Modifications, additions, or omissions may be made to FIG. 2 without departing from the scope of the present disclosure. For example, the interactive visual element 200 may include more or fewer elements than those illustrated and described in the present disclosure. For example, the interactive visual element 200 may include additional features, links, or aspects of interacting with the interactive visual element 200 not illustrated.

FIG. 3 illustrates another example interactive visual element 300, in accordance with one or more embodiments of the present disclosure. The interactive visual element 300 may be part of a user interface provided to a user. For example, the user interface may include the interactive visual element 200 from FIG. 2.

The interactive visual element 300 may represent a visual depiction of one or more listings responsive to a search request from a user. For example, if a user selected a particular region of a venue for an event for ticket sales, the interactive visual element 300 may represent an interactive map of seats in the section (as illustrated in FIG. 2). In some embodiments, the interactive visual element 300 may display listings that are displayed to the user (listings 310) in one format while displaying other listings (listings 320) to the user in a different format. The format may be based on any criteria, such a price, view, etc. For example, the listings 310 may including listings within a first price range and may be in a different shading, color, texture, or other visual representation to distinguish the listings 310 from the listings 320 that are within a second price range.

In some embodiments, the listings 310 and the listings 320 may have a corresponding textual description of the listing included. In some embodiments, seats not for sale may be depicted in a non-descript color such as white, gray, or black, or in a color to signify they are not displayed such as red, orange, or yellow.

In some embodiments, the interactive visual element 300 may be implemented using code implemented by the device of the user (e.g., the client device 120 of FIG. 1). For example, the interactive visual element 300 may be implemented using Javascript or Hypertext markup language (HTML). The device of the user may execute such user-device code. Based on the execution of the user-device code, the user may interact with the interactive visual element 300 to change a configuration of the interactive visual element 300.

For example, the interactive visual element 300 may include elements through which a user may interact with the interactive visual element 300. The user-device code executed by the device of the user may obtain the user interactions and change the configuration of the interactive visual element 300 accordingly. For example, the configuration of the interactive visual element 300 may change by changing the section of the venue displayed in the map. Alternately or additionally, the user-device code may request additional data from a server (e.g., the system server 140 of FIG. 1), such as images, listings, or other information. In at least one embodiment, the user may provide input to change or alter a presentation of listings. The input may be provided by the user through a graphical user interface tool, such as providing text to a text field, a selection of an item in a drop down box, or a selection (or deselection) of a check box, etc. For example, the user may provide input to exclude listings in an upper deck of a stadium or to only display seats that have weather enhanced graphical previews. In another example, the user may provide an input to control a number of listings that are shown (e.g., one, three, six, etc.). In another example, the user may provide input to present a weather enhanced graphical preview from a particular location. The user may also provide input to specify a time of day in which to present the weather enhanced graphical preview.

Modifications, additions, or omissions may be made to FIG. 3 without departing from the scope of the present disclosure. For example, the interactive visual element 300 may include more or fewer elements than those illustrated and described in the present disclosure. For example, the interactive visual element 300 may be part of a user interface that includes a textual description of included listings.

FIG. 4A illustrates an example weather enhanced graphical preview 400 from a particular location in a venue. The location may include a section in the venue, or a particular seat in the venue. The weather enhanced graphical preview 400 may include a point of interest 405 (e.g., a point on a baseball field, such as the infield, or the pitcher's mound). The weather enhanced graphical preview 400 depicts a representation or preview of what a user might see when sitting in a particular section or seat.

The weather enhanced graphical preview 400 may include weather data. As illustrated, the weather data includes a sun 415. The weather enhanced graphical preview 400 may include a representation of the sun 415 at a particular time 420. The weather enhanced graphical preview 400 may also include a time 420 at which the sun 415 may be in the position depicted in the weather enhanced graphical preview 400. The weather enhanced graphical preview 400 may also include multiple representations of the sun 415, illustrated as the sun 415*a* and the sun 415*b*. For example, a first representation of the sun 415*a* may indicate a first position of the sun at a first time 420*a* (e.g., at the beginning of an event) and a second representation of the sun 415*b* may include a position of the sun at a second time 420*b* (e.g., at the end of the event). In this manner, a user may preview different positions of the sun during the event. The weather enhanced graphical preview 400 may also include a path 430 the sun 415 may follow when moving from one position to another.

In at least one embodiment, the weather enhanced graphical preview 400 may include a time tool 450 by which different positions of the sun may be altered. As illustrated, the weather enhanced graphical preview 400 may include a slider bar that may be altered based on user input (e.g., mouse click, gesture). For example, a user may provide input via a touch screen to swipe the slider bar to move between different times. An initial position of the slider bar may be set at a first time, and in response to the user input, the slider bar may move to a second time. The depiction of the sun 415 may also move in response to the user input or the movement of the slider bar or the change in time. For example, user input may include a touch and slide on the slider bar and during the slide, the sun may move to a position in the sky that corresponds with the time depicted in the slider bar. In at least one embodiment, a range of time is depicted and two positions of the sun 415 are depicted. For example, for a time range between 4 pm and 4:59 pm, the sun 415*a* corresponds to 4 pm and the sun 415*b* corresponds to 4:59 pm. Both the sun 415*a* and the sun 415*b* may be depicted at the same time. The path 430 between the sun 415*a* and the sun 415*b* may also be illustrated. In at least one embodiment, the weather enhanced graphical preview 400 may depict the sun 415, and the path 430 without any adjustability.

FIG. 4B illustrates another example weather enhanced graphical preview 440 that may include the sun 415 in the context of a particular sports stadium. The example weather enhanced graphical preview 440 may also include the path 430 and/or the time tool 450.

FIG. 4C illustrates yet another example weather enhanced graphical preview 460 that may include the sun 415 in the context of another particular sports stadium. The example weather enhanced graphical preview 440 may also include the path 430 and/or the time tool 450.

Figure 5:
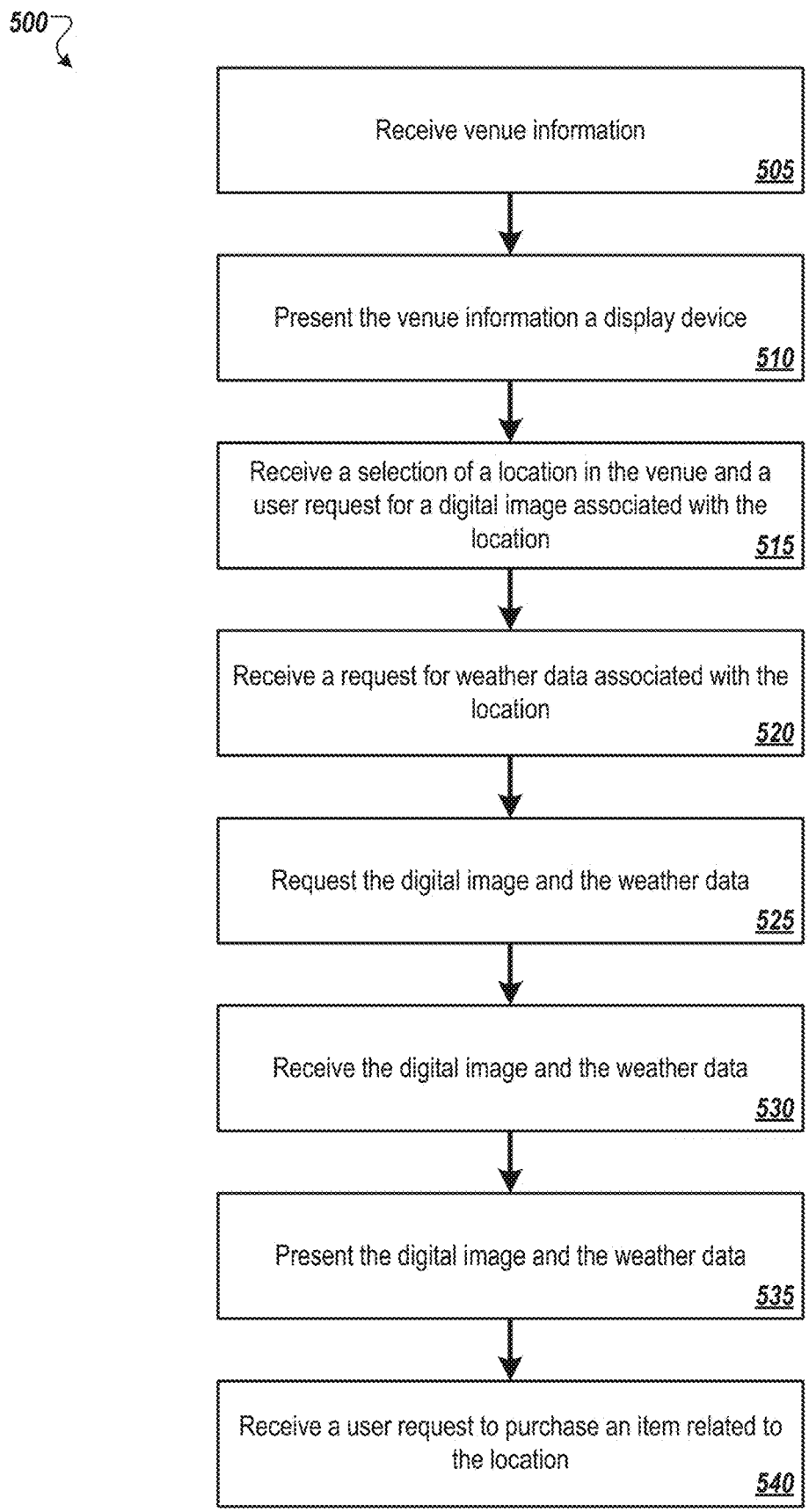
FIG. 5 includes a flowchart of an example computer-implemented method to present a weather enhanced graphical preview for an online ticket marketplace.

FIG. 5 includes a flowchart of an example computer-implemented method 500 to present weather enhanced graphical previews for an online ticket marketplace. The method 500 may be performed by any suitable system, apparatus, or device. For example, the client device 102 of FIG. 1 may perform one or more of the operations associated with the method 500. The method 500 may be performed by processing logic that may include hardware (circuitry, dedicated logic, etc.), software (such as is run on a general purpose computer system or a dedicated machine), or a combination of both. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Turning to FIG. 5, at block 505, processing logic may receive venue information (e.g., from system server 140 of FIG. 1 or from the venue information database 110 of FIG. 1). The venue information may include a digital map of the venue (e.g., the interactive visual element 200 of FIG. 2) that may depict multiple seating sections and individual seats in the venue. The venue information may also include event information. The seating section and/or seats may be arranged for a particular event. For example, the seats in a stadium may be arranged in a first seating arrangement for a baseball game and arranged in a second seating arrangement for a rock concert. The event information may include a time element (e.g., a date, an exact time, an approximate time, a time of day, such as morning, afternoon, evening). For example, the event information may include one or more teams competing at the event, a start time, and end time (or approximate end time), among others. At block 510, the processing logic may present the venue information via a display device. Presenting venue information may include displaying the digital map on the display device. For example, the processing logic may present the interactive visual element 200 of FIG. 2 or the interactive visual element 300 of FIG. 3. The processing logic may also present a preview tool, which may permit a user to preview what the user may see while in the particular location. A user may select the preview tool via the display device and/or a graphical user interface (GUI) to activate the preview tool. The preview tool may also include a feature to view weather data from the location.

At block 515, the processing logic may receive a selection of a location associated with the venue or event. For example, the processing logic may receive a selection (e.g., user input) of a seating section or a selection of a particular seat. In at least one embodiment, the processing logic may receive a selection of any location in the venue, such as via a pin drop. In at least one embodiment, the processing logic may obtain coordinates associated with the location. The coordinates may be relative to the venue, may be associated with a Global Positioning System (GPS), or may be latitudinal and longitudinal coordinates, among others.

At block 520, the processing logic may send a request for a digital image (e.g., a weather enhanced graphical preview) to preview the event from the location and for weather data in view of the time element. The processing logic may send the request in response to an activation of the preview tool and/or receiving user input to view weather from the location. In at least one embodiment, the processing logic may identify a point of interest of the event and send the point of interest with the request. In at least one embodiment, the point of interest may be indicated via user input. For example, the user may select the location and the point of interest.

At block 525, the processing logic may request the digital image and the weather data. In at least one embodiment, the processing logic may request the digital image from a first server and the weather data from a second server. The request may include an identification of the venue, coordinates of the venue, the location, or identification of an event, among other items. In at least one embodiment, the processing logic may retrieve the digital image and weather data from one or more databases.

At block 530, the processing logic may receive the digital image and the weather data. At block 535, the processing logic may present the digital image and the weather data via the display device. In at least one embodiment, the processing logic may receive instructions on how to present the digital image and the weather data. Alternatively, the processing logic may determine how to present the digital image and the weather data. For example, the weather data may include data pertaining to multiple sun positions that each correspond with a different time. The multiple sun positions may align with a path. To determine how to present the digital image and the weather data, the processing logic may use the point of interest to determine a direction based on the location. The processing logic may align the digital image and weather data (e.g., a sun position) along the direction at a particular time. For example, the digital image, the weather data and the venue information may each be associated with a particular coordinate system. The processing logic may present the digital image and the weather data according to the coordinate system. In an example the weather data includes at least two positions of a sun and each position of the at least two positions corresponds to a different time. Presenting the digital image and the weather data via the display device may include presenting the sun in a first position and presenting a first time associated with the first position. The processing logic may receive user input for a preview of the venue from the location at a second time. In response to receiving user input to view the sun at the second time, the processing logic may present the sun at a second position.

In at least one embodiment, the processing logic may present purchase information via the display device. The purchase information may include details on how to purchase an item pertaining to the vent (e.g., a ticket to a seat at the event), such as a price at which the item may be sold, discounts, or sales, etc. The purchase information may also include a link to a purchase page where the user may initiate a purchase of the item. In at least one embodiment, the purchase information may include a purchase tool that permits a user to purchase the item while the digital image is being presented. The purchase information may include a tool that may receive an item purchase request from the user. At block 540, the processing logic may receive a user request to purchase an item related to the location. The item purchase request may be forwarded to an information system that handles transactions and processed at the information system. A confirmation message may be sent to the processing logic and the processing logic may present the confirmation message via a display device.

Figure 6:
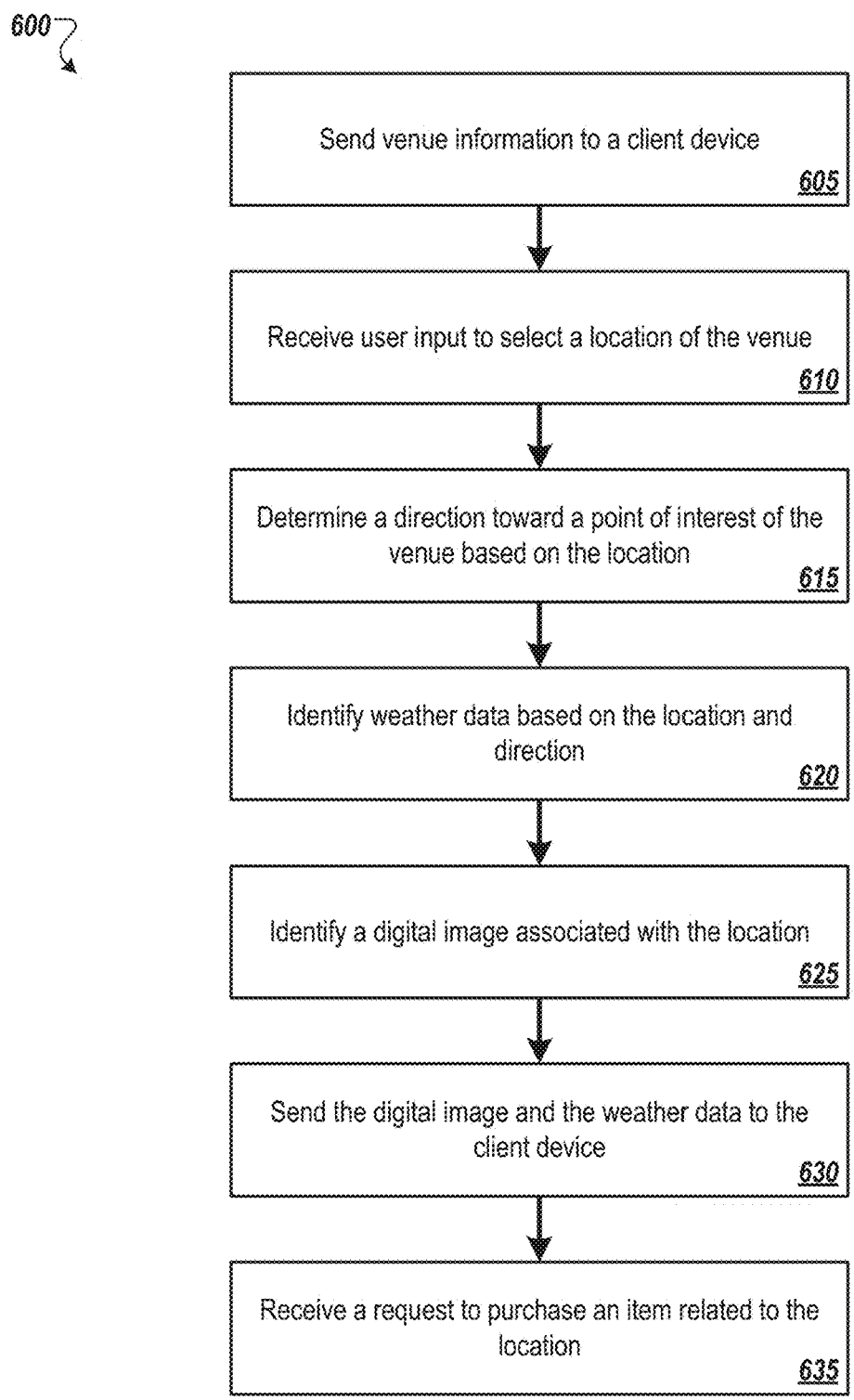
FIG. 6 includes a flowchart of an example computer-implemented method to determine a weather enhanced graphical preview for an online ticket marketplace.

FIG. 6 includes a flowchart of an example computer-implemented method 600 to determine weather enhanced graphical previews for an online ticket marketplace. The method 600 may be performed by any suitable system, apparatus, or device. For example, the ticket purchase manager 105 of FIG. 1 may perform one or more of the operations associated with the method 600. The method 600 may be performed by processing logic that may include hardware (circuitry, dedicated logic, etc.), software (such as is run on a general purpose computer system or a dedicated machine), or a combination of both. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Turning to FIG. 6, at block 605, processing logic may send venue information to a client device (e.g., the client device 102 of FIG. 1). The venue information may include the venue information described in conjunction with block 505 of FIG. 5. In at least one embodiment, the venue information may include a digital map of a venue that depicts multiple sections of the venue as arranged for a particular event.

At block 610, the processing logic may receive location data pertaining to a physical location in a venue. The location data may correspond to the location selected at block 515 of FIG. 5. The venue may include an item of interest. The item of interest may be received from a client device (e.g., as part of the location data). In at least one embodiment, the processing logic may use the venue information to determine the item of interest. For example, when the venue information includes information for a baseball game, the processing logic may determine that a pitcher's mound in the venue is the item of interest. In at least one embodiment, receiving the location data may include receiving, from the client device, a selection of a first section from among multiple sections.

At block 615, the processing logic may determine a direction toward the item of interest based on the location. Starting with the location, the processing logic may identify the direction from the location toward the point of interest. For example, the processing logic may determine a direction for a particular seating section or seat toward a pitcher's mound in the venue.

At block 620, the processing logic may identify weather data associated with the location and the direction. The processing logic may use the location and/or direction to determine the weather data. In at least one embodiment, the processing logic may perform a lookup in a weather data database using the location and a time associated with an event. The database may return a position of the sun at the location and at the particular time. The processing logic may use the direction to identify where the sun is to be presented in relation to a digital image. For example, the item of interest may include a baseball mound, the location may include a selected seating section or a specific seat, and the weather data may include a position of the sun. The direction may include the direction from the selected seating section or a specific seat to the baseball mound. Using this direction, the processing logic may determine the position of the sun in the sky.

At block 625, the processing logic may identify a digital image associated with the location. The digital image may include a two dimensional or three dimensional view of the venue from the location. The digital image may depict a view of at least part of the item of interest from the location. In at least one embodiment, digital images may be keyed by location such that a digital image may be identified using the location as a key. For example, a digital image may include metadata indicating the location (e.g., latitude, longitude). Using at least a portion of the latitudinal and longitudinal coordinates, the processing logic may identify the digital image. In at least one embodiment, the processing logic may identify or define a coordinate system for the digital image such that the weather data may be presented with the digital image with respect to the coordinate system.

At block 630, the processing logic may send the digital image and the weather data to the client device as a weather enhanced graphical preview. At the client device, the weather data may to be presented together with the digital image on an electronic display of the client device as the weather enhanced graphical preview. In at least one embodiment, the processing logic may combine the digital image and the weather data, such as by overlaying (and/or flattening) the weather data on the digital image. In at least one embodiment, the processing logic may create instructions for how to present the weather data and the digital image. The processing logic may generate instructions to instruct the client device to generate an interactive visual element depicting the digital image and the weather data via a user interface. For example, the instructions may include one or more times and associated positions in which to present the weather data over the digital image. The processing logic may send these instructions to the client device with the digital image and the weather data.

At block 635, the processing logic may receive a request to purchase an item relating to the location. The item may include a ticket to attend an event at the venue. For example, the processing logic may receive a request to purchase one or more seats in the venue and for a particular event.

Modifications, additions, or omissions may be made to the method 600 without departing from the scope of the present disclosure. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 7:
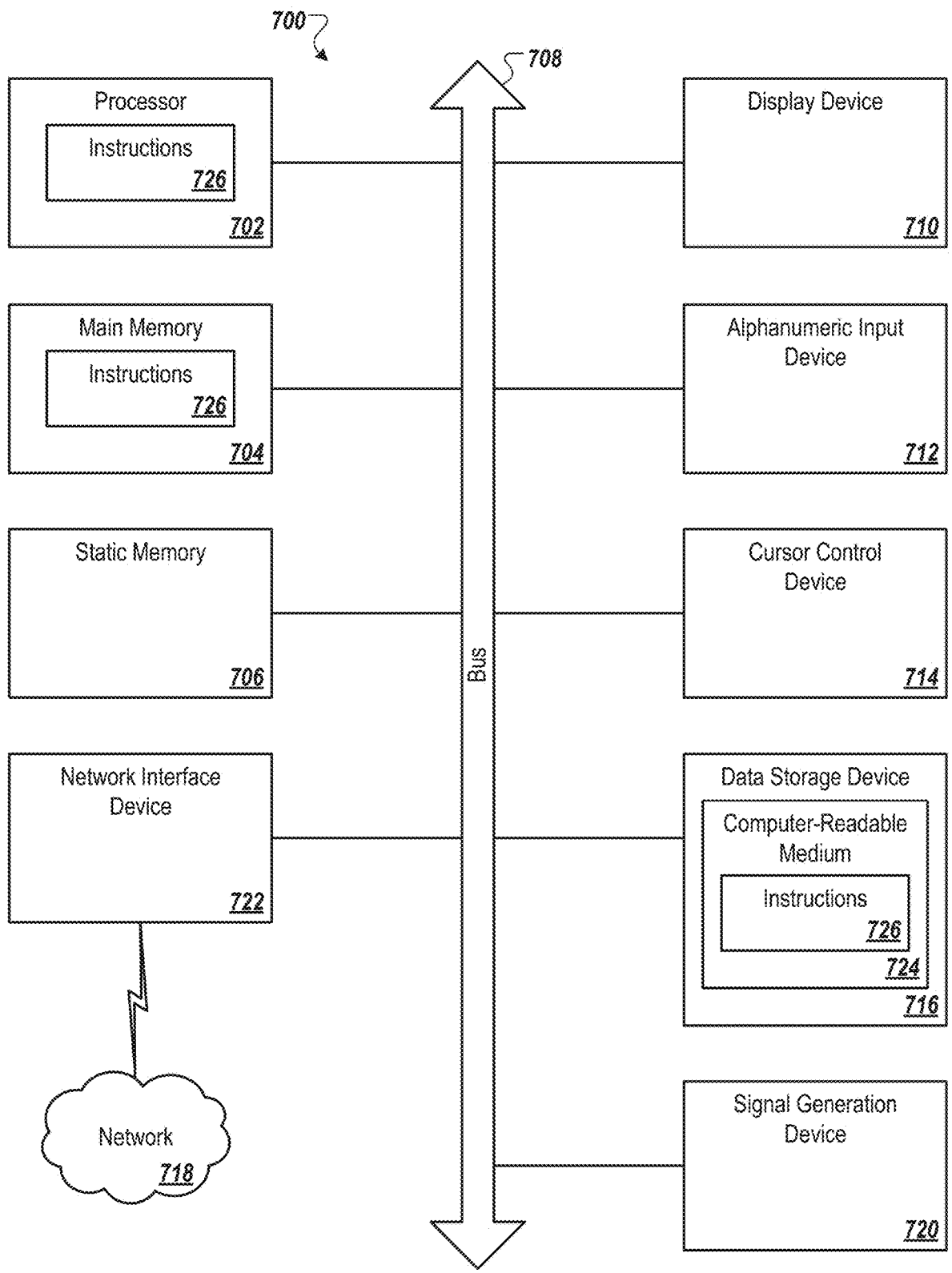
FIG. 7 illustrates a diagrammatic representation of a machine in the example form of a computing device within which a set of instructions, for causing the machine to perform any one or more of the methods discussed herein, may be executed, each in accordance with one or more embodiments of the present disclosure.

FIG. 7 illustrates a diagrammatic representation of a machine in the example form of a computing device 700 within which a set of instructions, for causing the machine to perform any one or more of the methods discussed herein, may be executed. The computing device 700 may include a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed in the present disclosure.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 716, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computing device 700 may further include a network interface device 722 which may communicate with a network 718. The computing device 700 also may include a display device 710 (e.g., a liquid crystal display (LCD) or a cathode ray tube (CRT)), an alphanumeric input device 712 (e.g., a keyboard), a cursor control device 714 (e.g., a mouse) and a signal generation device 720 (e.g., a speaker). In one implementation, the display device 710, the alphanumeric input device 712, and the cursor control device 714 may be combined into a single component or device (e.g., an LCD touch screen).

The data storage device 716 may include a computer-readable storage medium 724 on which is stored one or more sets of instructions 726 embodying any one or more of the methods or functions described herein. The instructions 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 718 via the network interface device 722.

While the computer-readable storage medium 726 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used in the present disclosure and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of the following: A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

What is claimed is:

1. A method, comprising:
   receiving, from a client device via a network at a computing system, location data pertaining to a physical location in a venue, the venue having an item of interest and an indication of a particular event at the venue;
   receiving, as a user selection from the client device, an indication of a location of an item of interest within the venue at the particular event;
   determining, by the computing system, a direction toward the item of interest based on the location data and the location of the item of interest;
   identifying, by the computing system, weather data, including forecasted weather conditions, associated with the location data and the direction at a time of the particular event at the venue;
   sending, via the network, the weather data to the client device, wherein the weather data is to be presented via a user interface on an electronic display of the client device as a computer generated overlay combined with a digital image on an electronic display of the client device, the computer generated overlay and the digital image being aligned in the direction of the item of interest at the time of the particular event and together comprising a computer-generated weather enhanced graphical preview of a view in the venue in the direction of the item of interest from the physical location of the venue presented with the weather data so as to present the view according to the forecasted weather conditions at the time of the particular event; and configuring a size and a position of the computer-generated weather enhanced graphical preview according to a resolution and an area of the electronic display of the client device, wherein the computer-generated weather enhanced graphical preview for a first electronic display has a larger size relative to the size of the computer-generated weather enhanced graphical preview in a second electronic display with a higher resolution and area than the first electronic display.

2. The method of claim 1, further comprising sending, to the client device, a digital map of the venue that depicts a plurality of sections of the venue as arranged for the particular event.

3. The method of claim 2, wherein receiving, from the client device, the location data pertaining to the physical location in the venue comprises receiving, from the client device, a selection of a first section from among the plurality of sections.

4. The method of claim 1, further comprising identifying the digital image, the digital image including a view of at least part of the item of interest from the location data.

5. The method of claim 1, further comprising receiving a request to purchase an item related to the location data.

6. The method of claim 5, wherein the item includes a ticket to attend the particular event at the venue.

7. The method of claim 1, further comprising:
obtaining instructions to instruct the client device to present the computer generated overlay of the digital image on the electronic display; and
sending, via the network, the instructions to the client device.

8. A system, comprising:
a memory, and a processor operatively coupled to the memory, the processor being capable to execute computer-readable instructions that, when executed by the processor, cause the processor to:
receive, from a client device, location data pertaining to a physical location in a venue, the venue having an indication of a particular event at the venue;
receive, as a user selection from the client device, an indication of a location of an item of interest within the venue at the particular event;
determine a direction toward the item of interest based on the location data and the location of the item of interest;
identify weather data, including forecasted weather conditions, associated with the location data and the direction at a time of the particular event at the venue;
send the weather data to the client device, wherein the weather data is to be presented via a user interface on an electronic display of the client device as a computer generated overlay combined with a digital image on an electronic display of the client device, the computer generated overlay and the digital image being aligned in the direction of the item of interest at the time of the particular event and together comprising a computer-generated weather enhanced graphical preview of a view in the venue in the direction of the item of interest from the physical location of the venue presented with the weather data so as to present the view according to the forecasted weather conditions at the time of the particular event; and
configure a size and a position of the computer-generated weather enhanced graphical preview according to a resolution and an area of the electronic display of the client device, wherein the computer-generated weather enhanced graphical preview for a first electronic display has a larger size relative to the size of the computer-generated weather enhanced graphical preview in a second electronic display with a higher resolution and area than the first electronic display.

9. The system of claim 8, the computer-readable instructions further causing the processor to send, to the client device, a digital map of the venue that depicts a plurality of sections of the venue as arranged for the particular event.

10. The system of claim 9, wherein receiving, from the client device, the location data pertaining to the physical location in the venue comprises receiving, from the client device, a selection of a first section from among the plurality of sections.

11. The system of claim 8, the computer-readable instructions further causing the processor to identify the digital image, the digital image including a view of at least part of the item of interest from the location data.

12. The system of claim 8, the computer-readable instructions further causing the processor to receive a request to purchase an item related to the location data.

13. The system of claim 8, the computer-readable instructions further causing the processor to:
obtain instructions to instruct the client device to present the computer generated overlay of the digital image on the electronic display; and
send the instructions to the client device.

14. A non-transitory computer-readable medium including computer readable instructions that, when executed by a processor, are configured to perform operations, comprising:
receive, from a client device, a location data pertaining to a physical location in a venue, the venue having an indication of a particular event at the venue;
receive, as a user selection from the client device, an indication of a location of an item of interest within the venue at the particular event;
determine a direction toward the item of interest based on the location data;
identify weather data, including forecasted weather conditions, associated with the location data and the direction at a time of the particular event at the venue and the location of the item of interest;
send the weather data to the client device, wherein the weather data is to be presented via a user interface on an electronic display of the client device as a computer generated overlay combined with a digital image on an electronic display of the client device, the computer generated overlay and the digital image being aligned in the direction of the item of interest at the time of the particular event and together comprising a computer-generated weather enhanced graphical preview of a view in the venue in the direction of the item of interest from the physical location of the venue presented with the weather data so as to present the view according to the forecasted weather conditions at the time of the particular event; and
configure a size and a position of the computer-generated weather enhanced graphical preview according to a resolution and an area of the electronic display of the client device, wherein the computer-generated weather enhanced graphical preview for a first electronic display has a larger size relative to the size of the computer-generated weather enhanced graphical preview in a second electronic display with a higher resolution and area than the first electronic display.

15. The non-transitory computer-readable medium of claim 14, the operations further comprising send, to the client device, a digital map of the venue that depicts a plurality of sections of the venue as arranged for the particular event.

16. The non-transitory computer-readable medium of claim 15, wherein receiving, from the client device, the location data pertaining to the physical location in the venue comprises receiving, from the client device, a selection of a first section from among the plurality of sections.

17. The non-transitory computer-readable medium of claim 14, the operations further comprising identify the digital image, the digital image including a view of at least part of the item of interest.

18. The non-transitory computer-readable medium of claim 14, the operations further comprising receive a request to purchase an item related to the location data.

19. The non-transitory computer-readable medium of claim 18, wherein the item includes a ticket to attend the particular event at the venue.

20. The non-transitory computer-readable medium of claim 14, the operations further comprising:
    obtain instructions to instruct the client device to present the computer generated overlay of the digital image on the electronic display; and
    send the instructions to the client device.

\* \* \* \* \*

UNITED STATES PATENT AND TRADEMARK OFFICE
CERTIFICATE OF CORRECTION

| | | |
|---|---|---|
| PATENT NO. | : 11,216,857 B2 | |
| APPLICATION NO. | : 15/190999 | |
| DATED | : January 4, 2022 | |
| INVENTOR(S) | : Gaurav Lokesh | |

It is certified that error appears in the above-identified patent and that said Letters Patent is hereby corrected as shown below:

In the Specification

At Column 15, Line 43: Please delete "726" after "While the computer-readable storage medium...", and add --724--

Signed and Sealed this
Twelfth Day of July, 2022

Katherine Kelly Vidal
*Director of the United States Patent and Trademark Office*